United States Patent
Suzuki

(10) Patent No.: US 6,810,977 B2
(45) Date of Patent: Nov. 2, 2004

(54) HYBRID VEHICLE AND METHOD IN WHICH THE ENGINE IS PREHEATED BEFORE START

(75) Inventor: Naoto Suzuki, Fujinomiya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/971,620

(22) Filed: Oct. 9, 2001

(65) Prior Publication Data

US 2002/0043410 A1 Apr. 18, 2002

(30) Foreign Application Priority Data

Oct. 16, 2000 (JP) ........................................ 2000-315095

(51) Int. Cl.[7] ............................................... B60K 6/04
(52) U.S. Cl. .................... 180/65.2; 123/41.14
(58) Field of Search ............................. 180/65.2, 65.3, 180/65.4; 123/41.14, 41.02, 179.3, 179.21

(56) References Cited

U.S. PATENT DOCUMENTS

| | | | | |
|---|---|---|---|---|
| 4,335,429 A | * | 6/1982 | Kawakatsu | ............... 180/65.2 |
| 4,365,606 A | * | 12/1982 | Endo | ..................... 123/179.21 |
| 5,255,733 A | * | 10/1993 | King | ......................... 180/65.3 |
| 5,291,960 A | * | 3/1994 | Brandenburg et al. | ..... 180/65.2 |
| 5,765,511 A | * | 6/1998 | Schatz | ...................... 123/41.14 |
| 5,801,499 A | * | 9/1998 | Tsuzuki et al. | ............. 180/65.2 |
| 6,138,618 A | * | 10/2000 | Genster | ..................... 123/41.14 |
| 6,199,517 B1 | * | 3/2001 | Genster et al. | .......... 123/41.14 |
| 6,253,866 B1 | * | 7/2001 | Kojima | ....................... 180/65.2 |
| 6,390,047 B1 | * | 5/2002 | Mitchell | ................... 123/179.3 |
| 6,408,968 B1 | * | 6/2002 | Wakashiro et al. | ........ 180/65.3 |
| 6,481,428 B1 | * | 11/2002 | Makki et al. | ........... 123/179.21 |

FOREIGN PATENT DOCUMENTS

| | | |
|---|---|---|
| JP | U-56-17724 | 4/1981 |
| JP | A-4-274926 | 9/1992 |
| JP | A-4-331402 | 11/1992 |
| JP | A-5-328527 | 12/1993 |
| JP | A-6-280722 | 10/1994 |
| JP | A 7-255104 | 10/1995 |
| JP | A 10-37785 | 2/1998 |

* cited by examiner

Primary Examiner—Frank Vanaman
(74) Attorney, Agent, or Firm—Oliff & Berridge, PLC

(57) ABSTRACT

An engine of a hybrid vehicle that is to be preheated before being started is connected to a heat accumulator that stores a portion of a cooling water that is kept warmed. During cold start of the vehicle, when a temperature of the cooling water in the heat accumulator is equal to or higher than a temperature of the cooling water in the engine by a preset amount, the cooling water kept warmed in the heat accumulator is fed into the engine. The motor is driven to operate the vehicle until the engine is sufficiently preheated.

18 Claims, 2 Drawing Sheets

HYBRID VEHICLE AND METHOD IN WHICH THE ENGINE IS PREHEATED BEFORE START

INCORPORATION BY REFERENCE

The disclosure of Japanese Patent Application No. 2000-315095 filed on Oct. 16, 2000, including the specification, drawings and abstract is incorporated herein by reference in its entirety.

BACKGROUND OF THE INVENTION

1. Field of Invention

The invention relates to a hybrid vehicle that is driven by any suitable combination of an internal combustion engine and an electric motor, in view of saving of energy resources and environmental protection, and in particular to such a hybrid vehicle with improved engine revolution performance and improved emission control at cold starting of the internal combustion engine.

2. Description of Related Art

It has been proposed to temporarily stop an internal combustion engine of a vehicle, such as an automobile, during an operation of the vehicle, for the sake of savings of energy resources and environmental protection, when certain conditions under which the engine is allowed or desired to be temporarily stopped are established. In fact, this technology has been implemented in some types of automobiles. The conditions for temporarily stopping the engine may be established when, for example, the vehicle stops at a red traffic light, or the vehicle stops or travels at a considerably low speed because of a traffic jam, or the like.

The above-described technology of temporarily stopping the engine may be employed in a hybrid vehicle including an engine, an electric motor, a generator and a battery. In the hybrid vehicle, power can be transmitted among the engine, the motor and the generator, and the motor uses the battery as an electric power supply. The hybrid vehicle may be driven by one or both of the engine and the motor. Namely, the hybrid vehicle runs by means of a selected one or both of the output of the engine and the output of the motor. Furthermore, the generator is driven when appropriate by utilizing one or both of the output of the engine and the inertia of the running vehicle, so as to charge the battery. A known example of a hybrid vehicle is disclosed in Japanese Laid-open Patent Publication No. 7-255104.

The aforementioned hybrid vehicle is driven by starting the engine that can be stopped temporarily during operation. The structure of the hybrid vehicle as described above is based on a general concept of the hybrid vehicle that is essentially driven by the engine but can be partially driven by a motor that assists the engine in driving the hybrid vehicle. In the above-structured hybrid vehicle, when start of the engine is required again to drive the vehicle, the engine in a stopped or a cold state has to be warmed up as quick as possible for resuming its normal condition.

SUMMARY OF THE INVENTION

On the other hand, the hybrid vehicle also can be started by the motor alone, even if the engine is in the stopped state. Accordingly the hybrid vehicle may be structured so as to be driven by starting the motor instead of the engine. If the engine is sufficiently preheated before driving the vehicle, the engine can be smoothly so operated and accordingly, emissions of harmful components in the exhaust gas during cold start of the engine can be reduced.

In view of the foregoing characteristics of the hybrid vehicle, it is an object of the invention to provide a hybrid vehicle with improved revolution performance and emission of the exhaust gas during cold start of the engine.

The foregoing and/or other objects are achieved by a hybrid vehicle including a power train including an engine, a battery and a motor, and which is selectively driven by at least one of the engine and the motor using the battery as a power supply. A heat accumulator holds at least a portion of a cooling water of the engine to be kept warmed. A pump feeds the cooling water held in the heat accumulator into the engine. An engine starting unit includes at least one of the motor and an electrically operated starter, a key switch that is turned on by a vehicle operator during operation of the vehicle, and a power supply controller that brings the motor into an operating state for driving the vehicle in response to turn-on of the key switch, and starts the engine. The power supply controller operates the pump to feed the warmed cooling water in the heat accumulator into the engine upon the turn-on of the key switch, and operates the engine starting unit to start the engine upon an elapse of a predetermined time period after the warmed cooling water in the heat accumulator starts being fed to the engine.

In the above-constructed hybrid vehicle, the power supply controller is operative to actuate the engine starting unit when the cooling water in the engine reaches a predetermined temperature through an operation of the pump.

According to another aspect of the invention, the power supply controller is operative to actuate the engine starting unit upon detection that an operating amount of an accelerator pedal is equal to or greater than a threshold value even before the cooling water in the engine reaches the predetermined temperature or before the elapse of the predetermined time period that is estimated to be required for the cooling water in the engine to reach the predetermined temperature through operation of the pump.

According to another aspect of the invention, the power supply controller is operative to actuate the engine starting unit upon detection that a state of charge of the battery is equal to or less than a predetermined threshold value even before the cooling water in the engine reaches the predetermined temperature or before the elapse of the predetermined time period that is estimated to be required for the cooling water in the engine to reach the predetermined temperature through an operation of the pump.

According to another aspect of the invention, the power supply controller may be operative to cancel an actuation of the pump to be performed prior to driving of the engine starting unit when a state in which a temperature of the cooling water in the engine does not reach a predetermined temperature repeats a predetermined number of cycles after an elapse of the predetermined time period that is estimated to be required for the cooling water to reach the predetermined temperature.

As described above, the hybrid vehicle is driven by operating at least one of an engine and a motor using a battery selectively as a power supply. In most types of the aforementioned hybrid vehicles, an output required for the vehicle just after starting may be derived from the motor by itself. In the case where a cooling water temperature in a heat accumulator is higher than a cooling water temperature in the engine by a predetermined degree when a key switch is turned on, the pump is actuated to feed the cooling water in the heat accumulator into the engine such that the engine is pre-heated and then started by actuating a drive unit for starting the engine. More specifically, the engine can be preheated by the heat accumulated in the heat accumulator before starting the vehicle so as to realize smooth engine operation by reducing the viscosity of an engine oil, and reduction in emissions of harmful unburned component such as HC and CO by making the fuel in the cylinder more combustible without deteriorating an output performance of the vehicle.

In accordance with an aspect of the invention, the power supply controller serves to operate the drive unit for starting the engine even before the cooling water in the engine reaches the predetermined temperature or before an elapse of the predetermined time period that is estimated to be required for the cooling water in the engine to reach a predetermined temperature. As a result, an effect for preheating the engine by means of the heat accumulator is maximized while minimizing the delay in starting the engine.

However, according to one aspect of the invention, even before the cooling water in the engine reaches the predetermined temperature, or the elapse of the predetermined time period, the power supply controller may actuate the engine starting unit immediately after detection that a state of charge of the battery is equal to or less than a predetermined threshold value. Accordingly, when the state of charge of the battery is insufficient, that is, the motor by itself cannot supply sufficient power to satisfy the required vehicle output, the power supply controller is allowed to start the engine immediately by temporarily canceling preheating of the engine by the heat accumulator.

According to another aspect of the invention, the power supply controller may be constructed to cancel actuation of the pump to be performed prior to driving of the engine starting unit when a state in which a temperature of the cooling water in the engine does not reach a predetermined temperature repeats a predetermined number of cycles after an elapse of the predetermined time period that is estimated to be required for the cooling water to reach the predetermined temperature. Such construction is capable of preventing the device for preheating the engine from deteriorating the vehicle performance in case a failure occurs in the heat accumulating system, including the pump. The predetermined number of cycles may be set to at least one, as well as to any number, so long as the function of the preheating device is not deteriorated and the failure occurred in the system is overcome.

BRIEF DESCRIPTION OF THE DRAWINGS

The foregoing and/or further objects, features and advantages of the invention will become more apparent from the following description of preferred embodiments with reference to the accompanying drawings wherein.

DETAILED DESCRIPTION OF PREFERRED EMBODIMENTS

Figure 1:
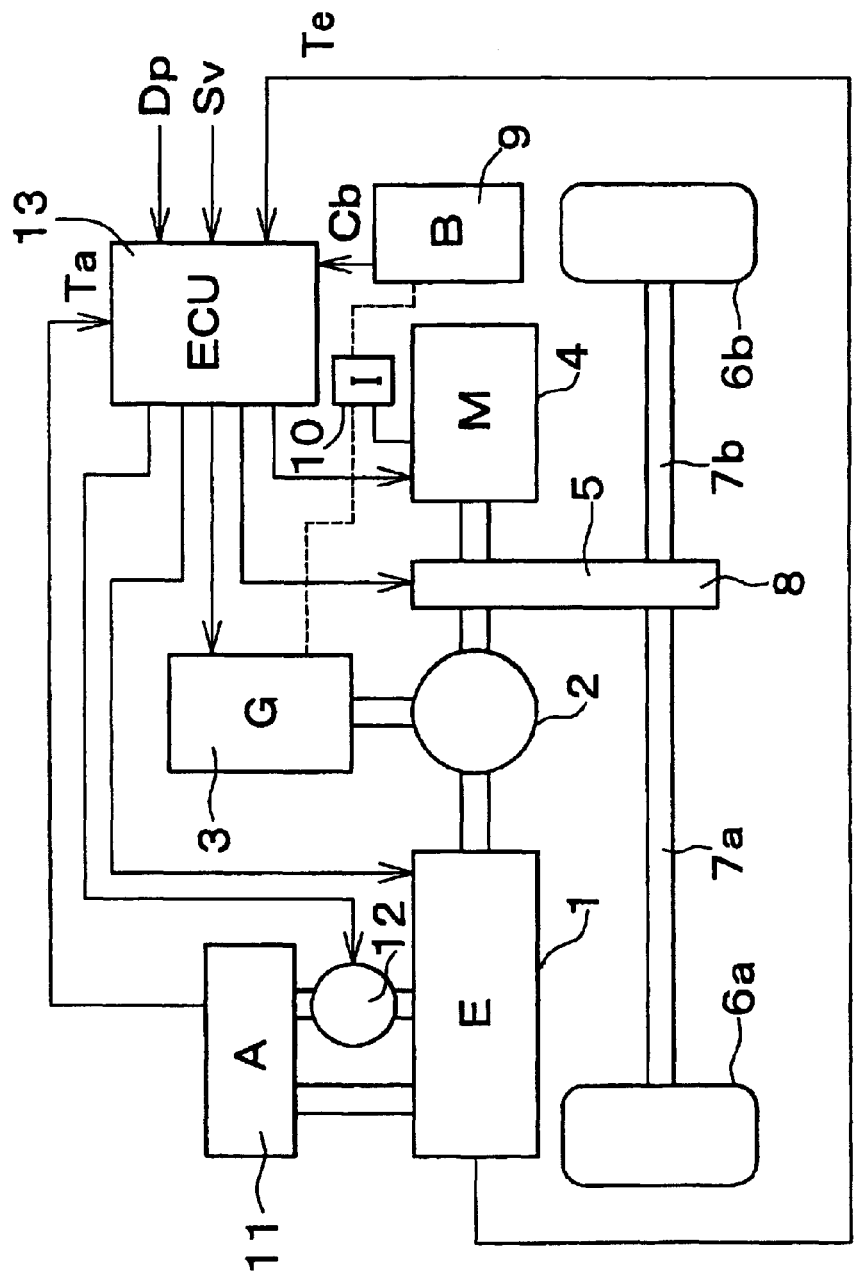
FIG. 1 is a view schematically showing the construction of a power-train system of a hybrid vehicle according to one preferred embodiment of the invention.

Referring to the drawings, an embodiment of the invention will be described in detail.

FIG. 1 schematically shows the construction of a power-train system employed in a hybrid vehicle according to one preferred exemplary embodiment of the invention. In FIG. 1, an internal combustion engine 1 is operatively connected to a generator 3 and a motor 4 via a drive coupling device 2 including a planetary gear set, such that power is transmitted among the engine 1, the generator 3 and the motor 4. The engine 1, the drive coupling device 2, the generator 3 and the motor 4 constitute a drive assembly for driving the hybrid vehicle. A transmission 5 is coupled to the drive assembly via a shaft of the motor 4. In operation, power is transmitted between the drive assembly of the engine 1, the generator 3, and the motor 4, and drive wheels 6a, 6b of the vehicle, via the transmission 5 and a pair of driving axles 7a, 7b. In the embodiment of FIG. 1, a differential gear system 8 is incorporated in the transmission 5, such that power for rotating the wheels 6a, 6b may be differentially transmitted to the driving axles 7a, 7b via the transmission 5.

A battery 9 is electrically connected to the generator 3 and the motor 4 via an inverter 10. The generator 3 functions to charge the battery 9 by generating power when the vehicle is driven by inertia (i.e., during coasting) or by the engine 1 during deceleration. The motor 4 functions to drive the vehicle as needed, using the battery 9 as an electric power supply. While the generator 3 and the motor 4 are separately provided in the embodiment of FIG. 1, a so-called "motor/generator" as an integral device may be employed in place of the generator 3 and the motor 4 as is well known in the art. The motor/generator selectively functions as a motor or as a generator, and the function of the motor/generator may be changed through switching of an electric circuit incorporated therein.

A heat accumulator 11 in which a cooling water is fed from the engine 1 and kept at a constant temperature is connected to the engine 1 such that the cooling water can flow between the heat accumulator 11 and the engine 1 via a pump 12. A capacity of the heat accumulator 11 may be determined in accordance with an environment in which the vehicle is operated such that the advantageous effect of the invention as described below can be maximized. A catalytic converter (not shown) using a three-way catalyst may be provided in an exhaust system of the engine. The catalytic converter does not function appropriately to purify harmful components such as NOx, CO and HC contained in the exhaust gas until it is sufficiently warmed up at a predetermined or higher temperature. It is, thus, preferable to reduce the time period for operating the engine in a cold state to as short a time as possible.

An electronic control unit (ECU) 13 functions to control the engine 1, generator 3, motor 4, transmission 5 and pump 12 in a manner as described below such that the hybrid vehicle of the invention can be operated. The motor 4 may be operated to start the engine 1. In addition to the motor 4, a starter for starting the engine may be provided. The ECU 13 receives signals concerning the operation of the vehicle indicating a depression amount of an accelerator pedal Dp, a vehicle speed Sv, a temperature Te of the engine 1, a temperature Ta of the heat accumulator 11, and a state of charge Cb of the battery.

Figure 2:
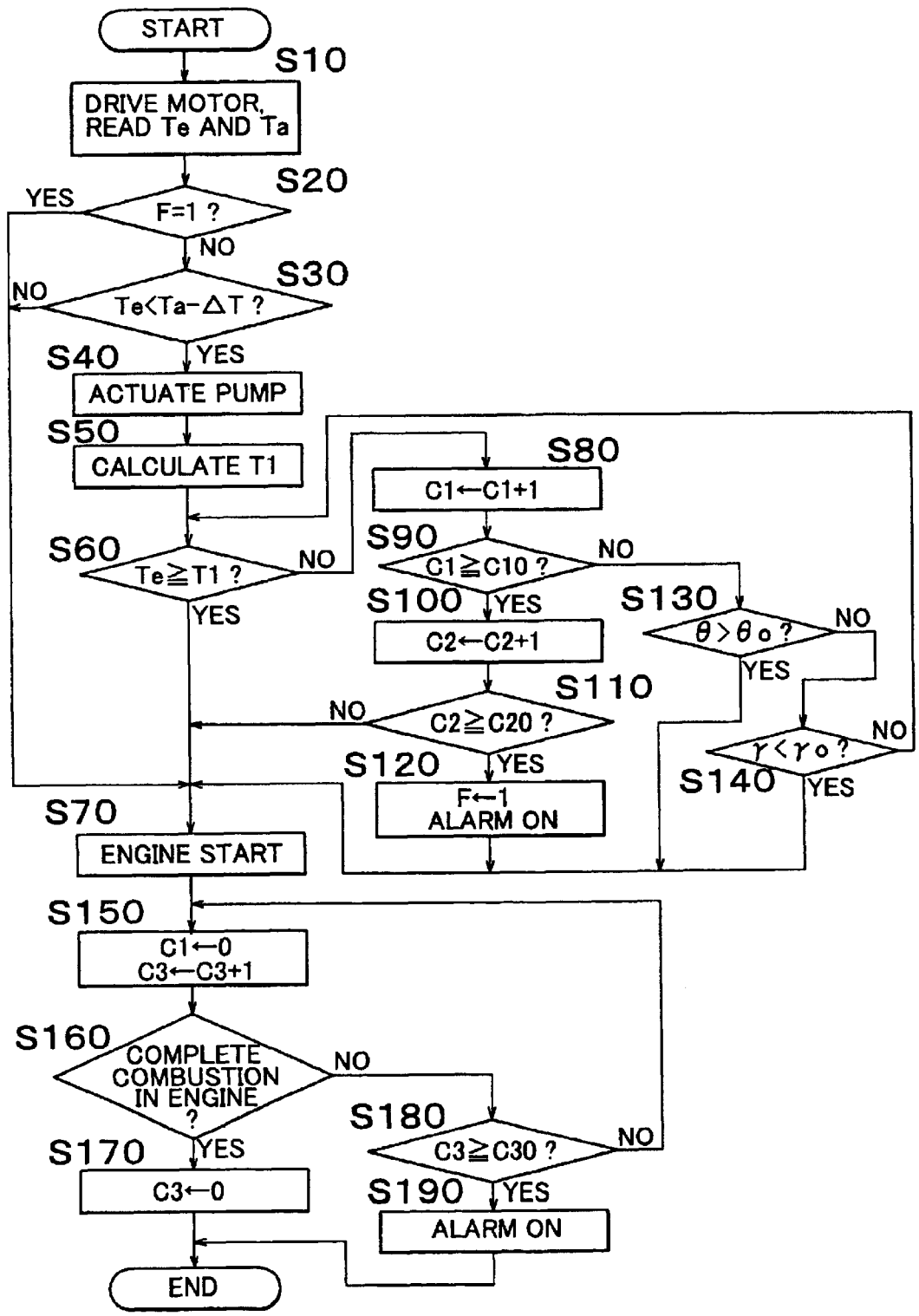
FIG. 2 is a flowchart illustrating one example of driving control at cold starting of the hybrid vehicle according to the invention.

Referring to the flowchart shown in FIG. 2, an operation of the above-constructed hybrid vehicle as shown in FIG. 1 will be explained. The flowchart shown in FIG. 2 covers a number of possible control routines for the hybrid vehicle according to various aspects of the invention. Accordingly, all steps of the control routine are not always required to achieve the invention. The step(s) that can be omitted will be identified as needed.

Upon start of the vehicle by turn-on of a key switch (not shown), the control routine starts from step S10 in which the motor 4 is started in response to an instruction of a vehicle operator (the instruction for starting the vehicle), and then the motor 4 is brought into an operating state for driving the vehicle until the engine is started to have a full combustion. In step S10 the cooling water temperature Te in the engine and the cooling water temperature Ta in the heat accumulator are read as data.

Then in step S20, it is determined whether a flag F is set to 1. The flag F is reset to 0 by an overall control routine on a regular basis each time the control cycle is started. Therefore, the flag F is expected to be set to 0 at a timing when the process proceeds to step S20 after starting the control routine. Accordingly, the determination in step S20 is NO, and the process proceeds to step S30.

In step S30, it is determined whether the engine cooling water temperature Te is lower than a temperature derived from subtracting a predetermined temperature $\Delta T$ from the accumulator cooling water temperature Ta. If YES is obtained in step S30, the process proceeds to step S40. The predetermined temperature $\Delta T$ is used to indicate whether the engine can be warmed up by feeding the cooling water in the heat accumulator 11 into the engine. If NO is obtained in step S30; indicating that the engine cannot be sufficiently warmed up by feeding the cooling water in the heat accumulator 11 into the engine, the process directly proceeds to step S70 rather than proceeding to step S40 and the subsequent steps for preheating the engine so as to start the engine.

In step S40, the pump 12 is actuated to feed the cooling water maintained at a constant temperature in the heat accumulator into the engine 1.

Then in step S50, a preheated cooling water temperature T1 is calculated on the basis of the temperatures Te and Ta read in step S10. The temperature T1 is obtained as a value indicating the cooling water temperature in the engine 1 that is estimated to be reached by feeding the cooling water at Ta from the heat accumulator into the engine 1.

The process proceeds to step S60 in which it is determined whether the temperature Te reaches the preheated cooling water temperature T1. As the temperature Te is less than the value T1 at an initial stage, the determination in step S60 is NO. The process then proceeds to step S80 in which a count value C1 of an electronic counter installed in the ECU 13 is incremented by 1. The count value C1 is reset to 0 each time the control routine is started.

Then in step S90, it is determined whether the present count value C1 reaches a count value C10. The count value C10 is used for counting a time required until an elapse of a time longer than the time that should be required for the cooling water temperature Te to reach the temperature T1 due to the feeding of a preset amount of the cooling water in the heat accumulator 11 into the engine 1. If the determination in step S60 is NO, even after the count value reaches C10, it is assumed that an abnormality has occurred in the cooling water feeding system including the pump 12. Thus, if YES is obtained in step S90, the process proceeds to step S100 in which another count value C2 is incremented by 1. In step S110, it is determined whether the count value C2 is equal to or greater than a predetermined count value C20. The count value C20 may be set, e.g., to 3 to 5, which is used to indicate abnormality only when step S90 determines NO a predetermined number of times. If NO is determined in step S110 only once, an abnormality is not determined. Thus, if NO is obtained in step S110, the process directly proceeds to step S70.

If YES is obtained in step S110, the process proceeds to step S120 in which the flag F is set to 1, and then an alarm, such as an alarm lamp, is placed ON for indicating the presence of an abnormality. This state of the flag, i.e., F=1 is stored as well as the ON state of the alarm even after the vehicle operation is stopped. Accordingly the determination in step S20 will be YES when the vehicle is started the next time. As a result, the engine preheating operation by means of the heat accumulator in step S30 and subsequent steps is not performed.

The control routine from step S80 to step S820 is desirable in view of actual vehicle operation according to the invention. However, such control routine is not essential in view of the scope of the invention as described below and thus, may be omitted. The invention is intended to actuate the drive unit for starting the engine after feeding the cooling water in the accumulator into the engine by a pump during cold start of the engine of a hybrid vehicle. The engine is warmed by heat accumulated in the heat accumulator before starting so as to decrease the viscosity of an engine oil for smooth operation. Additionally the fuel in the respective cylinders can be made combustible more easily such that emissions of harmful unburned components such as HC, CO and the like may be reduced. The invention is capable of achieving the aforementioned effects without deteriorating output performance of the vehicle.

In an initial state in which the system is normally operated, if step S60 determines NO, the determination of step S90 is also NO. The process proceeds to step S130 in which it is determined whether an accelerator opening $\theta$ derived from a signal indicating a depression amount Dp of an accelerator pedal as shown in FIG. 1 is equal to or greater than a predetermined threshold value $\theta_0$. The threshold value $\theta_0$ corresponds to an opening of the accelerator pedal with a substantially great force, indicating that the vehicle operator requires rapid acceleration. If YES is obtained in step S130, the process directly proceeds to step S70 for starting the engine.

If NO is obtained in step S130, the process proceeds to step S140 in which it is determined whether a state of charge $\gamma$ of the battery drops to be equal to or lower than a predetermined level $\gamma_0$ on the basis of a signal indicating a state of charge Cb as shown in FIG. 1. The state of charge equal to or lower than the predetermined level $\gamma_0$ indicates that a battery output is insufficient and, thus, an immediate starting of the engine is required rather than actuating the pump 12. Accordingly if YES is obtained in step S140, the process immediately proceeds to step S70. Only when NO is obtained in both step S130 and step S140, the process returns to step S60 in which sufficient amount of the cooling water in the heat accumulator 11 is fed by the pump 12 into the engine 1 until YES is obtained in step S60.

As steps S130, S140 and the resultant control flow subsequent thereto are not essential in view of the scope of the invention, one or both of those control routines may be omitted.

After starting the engine in step S70, the process proceeds to step S150 in which the count value C1 is reset to 0, and a count value C3 of another counter is incremented by 1. Then the process proceeds to step S160 in which it is determined whether combustion is completed in the engine. If YES is obtained in step S160, the process proceeds to step S170 in which the count value C3 is reset to 0. The control for preheating at an engine starting is terminated. The pump 12 actuated in step S40 can be operated during operation of the engine such that the cooling water heated in the engine is always fed into the heat accumulator for the next stoppage of the engine. In this case, the pump 12 is fully operated until all the cooling water kept at a constant temperature in the heat accumulator is fed into the engine after execution in step S40. When all the cooling water held in the accumulator is fed into the engine, the pump 12 is operated at a low speed sufficient to maintain a gentle circulation of the cooling water between the engine and the accumulator.

Step S160 determines NO until completion of the engine combustion, and accordingly, the process proceeds to step S180 in which it is determined whether the count value C3 exceeds a threshold value C30. The threshold value C30 is set to a value corresponding to a time longer than the time estimated to be taken for complete combustion in the engine with no abnormality after starting. If NO is obtained in step S180, the process returns to step S150. If YES is obtained in step S180 in the state where combustion has not been completed in the engine, the engine may not be started in a normal condition. In this case, failure in normal starting of the engine is indicated in step S190, and an alarm is turned ON such that the vehicle operator is prompted to operate the vehicle. This control routine, thus, is terminated. When the vehicle operator starts operating the vehicle again, the control routine starts from step S10. When a series of the control shown in the flowchart is terminated as a result of failure in complete combustion in the engine, the key switch is kept turned on. Then a push button for restarting may be pressed.

In the illustrated embodiment, a controller (the ECU 13) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A hybrid vehicle, comprising:
a power train including an engine, a battery and a motor, the hybrid vehicle being selectively driven by at least one of the engine and the motor using the battery as a power supply;
   a heat accumulator that holds at least a portion of cooling water of the engine to be kept warmed;
   a pump that feeds the cooling water held in the heat accumulator into the engine;
   an engine starting unit that includes at least one of the motor and an electrically operated starter; and
   a power supply controller operative to start the engine in response to a request for starting the engine, wherein the power supply controller operates the pump to feed the cooling water in the heat accumulator into the engine upon the request for starting the engine, operates the engine starting unit to start the engine upon an elapse of a predetermined time period after the cooling water in the heat accumulator starts being fed to the engine, actuates the engine starting unit when the cooling water in the engine reaches a predetermined temperature due to operation of the pump, and actuates the engine starting unit upon detection that an operating amount of an accelerator pedal is equal to or greater than a threshold value before the cooling water in the engine reaches the predetermined temperature.

2. A hybrid vehicle according to claim 1, wherein the power supply controller actuates the engine starting unit upon detection that a state of charge of the battery is equal to or less than a predetermined threshold value before the cooling water in the engine reaches the predetermined temperature.

3. A hybrid vehicle, comprising: a power train including an engine, a battery and a motor, the hybrid vehicle being selectively driven by at least one of the engine and the motor using the battery as a power supply;
   a heat accumulator that holds at least a portion of cooling water of the engine to be kept warmed;
   a pump that feeds the cooling water held in the heat accumulator into the engine;
   an engine starting unit that includes at least one of the motor and an electrically operated starter; and
   a power supply controller operative to start the engine in response to a request for starting the engine, wherein the power supply controller operates the pump to feed the cooling water in the heat accumulator into the engine upon the request for starting the engine, operates the engine starting unit to start the engine upon an elapse of a predetermined time period after the cooling water in the heat accumulator starts being fed to the engine, actuates the engine starting unit when the cooling water in the engine reaches a predetermined temperature due to operation of the pump, and actuates the engine starting unit upon detection that a state of charge of the battery is equal to or less than a predetermined threshold value before the cooling water in the engine reaches the predetermined temperature.

4. A hybrid vehicle, comprising:
a power train including an engine, a battery and a motor, the hybrid vehicle being selectively driven by at least one of the engine and the motor using the battery as a power supply;
   a heat accumulator that holds at least a portion of cooling water of the engine to be kept warmed;
   a pump that feeds the cooling water held in the heat accumulator into the engine;
   an engine starting unit that includes at least one of the motor and an electrically operated starter; and
   a power supply controller operative to start the engine in response to a request for starting the engine, wherein the power supply controller operates the pump to feed the cooling water in the heat accumulator into the engine upon the request for starting the engine, operates the engine starting unit to start the engine upon an elapse of a predetermined time period after the cooling water in the heat accumulator starts being fed to the engine, actuates the engine starting unit upon an elapse of a predetermined time period that is estimated to be required for the cooling water in the engine to reach a predetermined temperature due to operation of the pump, and actuates the engine starting unit upon detection that a state of charge of the battery is equal to or less than a predetermined threshold value before the elapse of the predetermined time period that is estimated to be required for the cooling water in the engine to reach the predetermined temperature due to operation of the pump.

5. A hybrid vehicle, comprising:
a power train including an engine, a battery and a motor, the hybrid vehicle being selectively driven by at least one of the engine and the motor using the battery as a power supply;
   a heat accumulator that holds at least a portion of cooling water of the engine to be kept warmed;
   a pump that feeds the cooling water held in the heat accumulator into the engine;
   an engine starting unit that includes at least one of the motor and an electrically operated starter; and
   a power supply controller operative to start the engine in response to a request for starting the engine, wherein the power supply controller operates the pump to feed the cooling water in the heat accumulator into the engine upon the request for starting the engine, operates the engine starting unit to start the engine upon an elapse of a predetermined time period after the cooling water in the heat accumulator starts being fed to the engine, actuates the engine starting unit upon an elapse of a predetermined time period that is estimated to be required for the cooling water in the engine to reach a predetermined temperature due to operation of the pump, and actuates the engine starting unit upon detection that an operating amount of an accelerator pedal is equal to or greater than a threshold value before the elapse of the predetermined time period that is estimated to be required for the cooling water in the engine to reach a predetermined temperature due to operation of the pump.

6. A hybrid vehicle according to claim 5, wherein the power supply controller actuates the engine starting unit upon detection that a state of charge of the battery is equal to or less than a predetermined threshold value before the elapse of the predetermined time period that is estimated to be required for the cooling water in the engine to reach the predetermined temperature due to operation of the pump.

7. A hybrid vehicle, comprising:
a power train including an engine, a battery and a motor, the hybrid vehicle being selectively driven by at least one of the engine and the motor using the battery as a power supply;
   a heat accumulator that holds at least a portion of cooling water of the engine to be kept warmed;
   a pump that feeds the cooling water held in the heat accumulator into the engine;
   an engine starting unit that includes at least one of the motor and an electrically operated starter; and
   a power supply controller operative to start the engine in response to a request for starting the engine, wherein the power supply controller operates the pump to feed the cooling water in the heat accumulator into the engine upon the request for starting the engine, operates the engine starting unit to start the engine upon an elapse of a predetermined time period after the cooling water in the heat accumulator starts being fed to the engine, and cancels an actuation of the pump to be performed prior to driving of the engine starting unit when a state in which a temperature of the cooling water in the engine does not reach a predetermined temperature repeats a predetermined number of cycles after an elapse of the predetermined time period that is estimated to be required for the cooling water to reach a predetermined temperature.

8. A hybrid vehicle, comprising:
a power train including an engine, a battery and a motor, the hybrid vehicle being selectively driven by at least one of the engine and the motor using the battery as a power supply;
   a heat accumulator that holds at least a portion of cooling water of the engine to be kept warmed;
   a pump that feeds the cooling water held in the heat accumulator into the engine;
   an engine starting unit that includes at least one of the motor and an electrically operated starter;
   a power supply controller operative to start the engine in response to a request for starting the engine; and
   a key switch that is turned on in response to the request for starting the engine, wherein the power supply controller operates the pump to feed the cooling water in the heat accumulator into the engine upon the request for starting the engine, operates the engine starting unit to start the engine upon an elapse of a predetermined time period after the cooling water in the heat accumulator starts being fed to the engine, and cancels an actuation of the pump to be performed prior to driving of the engine starting unit when a state in which a temperature of the cooling water in the engine does not reach a predetermined temperature repeats a predetermined number of cycles after an elapse of the predetermined time period that is estimated to be required for the cooling water to reach the predetermined temperature.

9. A hybrid vehicle, comprising:
a power train including an engine, a battery and a motor, the hybrid vehicle being selectively driven by at least one of the engine and the motor using the battery as a power supply;
   a heat accumulator that holds at least a portion of cooling water of the engine to be kept warmed;
   a pump that feeds the cooling water held in the heat accumulator into the engine;
   an engine starting unit that includes at least one of the motor and an electrically operated starter; and
   a power supply controller operative to start the engine in response to a request for starting the engine, wherein the power supply controller operates the pump to feed the cooling water in the heat accumulator into the engine upon the request for starting the engine, operates the engine starting unit to start the engine upon an elapse of a predetermined time period after the cooling water in the heat accumulator starts being fed to the engine, operates the pump to feed the cooling water in the heat accumulator into the engine if a temperature of the cooling water in the heat accumulator is higher than a temperature of the cooling water in the engine by a present amount, and cancels an actuation of the pump to be performed prior to driving of the engine starting unit when a state in which a temperature of the cooling water in the engine does not reach a predetermined temperature repeats a predetermined number of cycles after an elapse of the predetermined time period that is estimated to be required for the cooling water to reach the predetermined temperature.

10. A method for controlling a hybrid vehicle including an engine, a battery and a motor, the hybrid vehicle being selectively driven by at least one of the engine and the motor using the battery as a power supply the method comprising the steps of:

holding at least a portion of cooling water of the engine to be kept warmed in a heat accumulator;

feeding the cooling water stored in the heat accumulator into the engine by a pump; and operating the pump to feed the cooling water in the heat accumulator into the engine in response to a request for starting the engine and actuating an engine starting unit to start the engine upon an elapse of a predetermined time period after the cooling water in the heat accumulator starts being fed to the engine, wherein the engine starting unit includes at least one of the motor and an electrically operated starter, the engine starting unit is actuated when the cooling water in the engine reaches a predetermined temperature due to the operation of the pump, and the engine starting unit is actuated upon detection that an operating amount of an accelerator pedal is equal to or greater than a threshold value before the cooling water in the engine reaches the predetermined temperature.

11. A method according to claim 10, wherein the engine starting unit is actuated upon detection that a state of charge of the battery is equal to or less than a predetermined threshold value before the cooling water in the engine reaches the predetermined temperature.

12. A method for controlling a hybrid vehicle including an engine, a battery and a motor, the hybrid vehicle being selectively driven by at least one of the engine and the motor using the battery as a bower supply, the method comprising the steps of:

holding at least a portion of cooling water of the engine to be kept warmed in a heat accumulator;

feeding the cooling water stored in the heat accumulator into the engine by a pump; and operating the pump to feed the cooling water in the heat accumulator into the engine in response to a request for starting the engine and actuating an engine starting unit to start the engine upon an elapse of a predetermined time period after the cooling water in the heat accumulator starts being fed to the engine, wherein the engine starting unit includes at least one of the motor and an electrically operated starter, the engine starting unit is actuated when the cooling water in the engine reaches a predetermined temperature due to the operation of the pump, and the engine starting unit is actuated upon detection that a state of charge of the battery is equal to or less than a predetermined threshold value before the cooling water in the engine reaches the predetermined temperature.

13. A method for controlling a hybrid vehicle including an engine, a battery and a motor, the hybrid vehicle being selectively driven by at least one of the engine and the motor using the battery as a power supply, the method comprising the steps of:

holding at least a portion of cooling water of the engine to be kept warmed in a heat accumulator;

feeding the cooling water stored in the heat accumulator into the engine by a pump; and operating the pump to feed the cooling water in the heat accumulator into the engine in response to a request for starting the engine and actuating an engine starting unit to start the engine upon an elapse of a predetermined time period after the cooling water in the heat accumulator starts being fed to the engine, wherein the engine starting unit is actuated upon an elapse of a predetermined time period that is estimated to be required for the cooling water in the engine to reach a predetermined temperature due to the operation of the pump, and actuated upon detection that an operating amount of an accelerator pedal is equal to or greater than a threshold value before the elapse of the predetermined time period that is estimated to be required for the cooling water in the engine to reach the predetermined temperature due to the operation of the pump.

14. A method according to claim 13, wherein the engine starting unit is actuated upon detection that a state of charge of the battery is equal to or less than a predetermined threshold value before the elapse of the predetermined time period that is estimated to be required for the cooling water in the engine to reach the predetermined temperature.

15. A method for controlling a hybrid vehicle including an engine, a battery and a motor, the hybrid vehicle being selectively driven by at least one of the engine and the motor using the battery as a power supply, the method comprising the steps of:

holding at least a portion of cooling water of the engine to be kept warmed in a heat accumulator;

feeding the cooling water stored in the heat accumulator into the engine by a pump; and operating the pump to feed the cooling water in the heat accumulator into the engine in response to a request for starting the engine and actuating an engine starting unit to start the engine upon an elapse of a predetermined time period after the cooling water in the heat accumulator starts being fed to the engine, wherein the engine starting unit is actuated upon an elapse of a predetermined time period that is estimated to be required for the cooling water in the engine to reach a predetermined temperature due to the operation of the pump, and actuated upon detection that a state of charge of the battery is equal to or less than a predetermined threshold value before the elapse of the predetermined time period that is estimated to be required for the cooling water in the engine to reach the predetermined temperature due to the operation of the pump.

16. A method for controlling a hybrid vehicle including an engine, a battery and a motor, the hybrid vehicle being selectively driven by at least one of the engine and the motor using the battery as a power supply, the method comprising the steps of:

holding at least a portion of cooling water of the engine to be kept warmed in a heat accumulator;

feeding the cooling water stored in the heat accumulator into the engine by a pump; and operating the pump to feed the cooling water in the heat accumulator into the engine in response to a request for starting the engine and actuating an engine starting unit to start the engine upon an elapse of a predetermined time period after the cooling water in the heat accumulator starts being fed to the engine, wherein the operation of the pump to be performed is cancelled prior to actuating the engine starting unit when a state in which a temperature of the cooling water in the engine does not reach a predetermined temperature repeats a predetermined number of cycles after an elapse of the predetermined time period that is estimated to be required for the cooling water to reach the predetermined temperature.

17. A method for controlling a hybrid vehicle including an engine, a battery and a motor, the hybrid vehicle being selectively driven by at least one of the engine and the motor using the battery as a power supply, the method comprising the steps of:

holding at least a portion of cooling water of the engine to be kept warmed in a heat accumulator;

feeding the cooling water stored in the heat accumulator into the engine by a pump; and operating the pump to feed the cooling water in the heat accumulator into the engine in response to a request for starting the engine and actuating an engine starting unit to start the engine upon an elapse of a predetermined time period after the cooling water in the heat accumulator starts being fed to the engine, wherein the request for starting the engine is generated by a turn-on of a key switch, and the operation of the pump to be performed is cancelled prior to actuating the engine starting unit when a state in which the temperature of the cooling water in the engine does not reach a predetermined temperature repeats a predetermined number of cycles after an elapse of the predetermined time period that is estimated to be required for the cooling water to reach the predetermined temperature.

18. A method for controlling a hybrid vehicle including an engine, a battery and a motor, the hybrid vehicle being selectively driven by at least one of the engine and the motor using the battery as a power supply, the method comprising the steps of:

holding at least a portion of cooling water of the engine to be kept warmed in a heat accumulator;

feeding the cooling water stored in the heat accumulator into the engine by a pump; and operating the pump to feed the cooling water in the heat accumulator into the engine in response to a request for starting the engine and actuating an engine starting unit to start the engine upon an elapse of a predetermined time period after the cooling water in the heat accumulator starts being fed to the engine, wherein the pump is operated to feed the cooling water in the heat accumulator into the engine if a temperature of the cooling water in the heat accumulator is higher than a temperature of the cooling water in the engine by a preset amount, and the operation of the pump to be performed is cancelled prior to actuating the engine starting unit when a state in which the temperature of the cooling water in the engine does not reach a predetermined temperature repeats a predetermined number of cycles after an elapse of the predetermined time period that is estimated to be required for the cooling water to reach the predetermined temperature.

* * * * *